United States Patent [19]

Turnquist

[11] Patent Number: 4,585,557
[45] Date of Patent: Apr. 29, 1986

[54] APPARATUS FOR CONCENTRATING, SEPARATING AND REMOVING FLOATING SOLID MATERIAL

[76] Inventor: Sanfred E. Turnquist, Rte. 1, Box 4, Caddo Gap, Ark. 71935

[21] Appl. No.: 568,148

[22] Filed: Jan. 4, 1984

[51] Int. Cl.⁴ ............................................. B01D 35/00
[52] U.S. Cl. .................................... 210/320; 210/525; 209/208
[58] Field of Search ................... 210/195 R, 515, 519, 210/521, 523, 528, 531, 532.1, 536, 540, 919, 921, 167, 242.3, 923, 320, 525; 55/228, 240, DIG. 46; 98/175 R, 115 SB; 118/326, DIG. 7; 209/208

[56] References Cited

U.S. PATENT DOCUMENTS

| | | | |
|---|---|---|---|
| 1,441,560 | 1/1923 | Connors | 210/221.2 |
| 2,121,680 | 2/1938 | Ciabattari | 210/703 |
| 2,746,605 | 5/1956 | Baum | 210/221.1 |
| 2,788,954 | 4/1957 | Paasche | 261/5 |
| 2,793,185 | 5/1957 | Albrektsson et al. | 210/703 |
| 2,805,844 | 9/1957 | McMaster | 261/3 |
| 2,813,074 | 11/1957 | Banks et al. | 210/703 |
| 2,994,432 | 8/1961 | Schluter | 210/101 |
| 3,121,680 | 2/1964 | Ciabattari | 210/703 |
| 3,175,687 | 3/1965 | Jones | 210/221.1 |
| 3,286,844 | 11/1966 | Juell | 210/523 |
| 3,301,779 | 1/1967 | Kovacs | 210/705 |
| 3,418,236 | 12/1968 | Mail | 210/221.2 |
| 3,479,281 | 11/1969 | Kinkindai et al. | 204/149 |
| 3,516,230 | 6/1970 | Saubesty | 55/228 |
| 3,547,800 | 12/1970 | Pan | 204/149 |
| 3,642,618 | 2/1972 | Silva | 210/706 |
| 3,679,056 | 7/1972 | Haymore | 210/221.1 |
| 3,726,780 | 4/1973 | Harnden et al. | 204/149 |
| 3,756,933 | 9/1973 | Greenberg | 204/151 |
| 3,817,865 | 6/1974 | Austin | 204/149 |
| 3,853,736 | 12/1974 | Harnden et al. | 204/149 |
| 3,929,640 | 12/1975 | Dohnert | 210/519 |
| 3,945,918 | 3/1966 | Kirk | 210/703 |
| 3,966,598 | 6/1976 | Ettelt | 210/703 |
| 4,009,106 | 2/1977 | Smith | 210/540 |
| 4,096,066 | 6/1978 | Kearney | 210/523 |
| 4,216,085 | 8/1980 | Chittenden | 210/703 |
| 4,220,078 | 9/1980 | Walker et al. | 55/240 |
| 4,372,854 | 2/1983 | Szereday | 210/242.3 |
| 4,425,870 | 1/1984 | Marshke | 210/240 |
| 4,469,595 | 9/1984 | Napadow | 210/167 |
| 4,472,181 | 9/1984 | Herrlander | 55/228 |
| 4,501,671 | 2/1985 | Bazell | 210/532.1 |

FOREIGN PATENT DOCUMENTS

2940180  4/1981  Fed. Rep. of Germany .......... 55/46

Primary Examiner—Richard V. Fisher
Assistant Examiner—Sharon T. Cohen
Attorney, Agent, or Firm—Robert M. Ward

[57] ABSTRACT

The improved apparatus of the present invention functions to substantially concentrate, separate, and remove floating solid materials from the surface of a volume of liquid. In preferred embodiments, the apparatus functions in two stages. In the first stage, the apparatus is directed to a treatment volume that is disposed adjacent an untreated volume of liquid. An entry means is disposed therebetween for flow of the surface portion of the untreated volume thereover. A baffle is disposed across the treatment volume and extends to a depth beneath the surface to permit the flow of the liquid thereunder, but to entrain the flow of solids material and to channel the flow of solids material into a take-off chamber over a take-off weir. In the second stage of the concentrating, separating, removing apparatus of the present invention, an influent flow of solids containing liquid is directed horizontally across and near the surface thereof to accumulate a sludge on the surface of the volume. The accumulated sludge is then removed from the surface, and effluent is withdrawn from the bottom portion of the treatment volume, and returned to the source, such as a spray booth header.

26 Claims, 5 Drawing Figures

APPARATUS FOR CONCENTRATING, SEPARATING AND REMOVING FLOATING SOLID MATERIAL

BACKGROUND OF THE INVENTION

The present invention relates generally to an improved apparatus for purification and recycling of waste water, and more particularly to an improved apparatus for substantially concentrating, selectively separating, and removing floating solids material, such as overspray paint, from the surface of an untreated volume of liquid, such as the liquid in a paint spray booth.

The treatment of waste water has been a problem of significant proportions. The particular problem of the accumulation of settled out paint within a spray booth which is used in conjunction with a production line, such as in the automobile industry, is a problem of major difficulty and expense.

Typically, when products are spray painted in a spray booth, the products to be painted are moved by means of a production line in front of a waterfall or wall of water to serve as a backdrop for spray painting. The paint which does not engage and coat the product to be painted strikes the flowing water of the wall of water in the form of overspray and is carried downwardly into a tank of water. In the prior art, the paint overspray would settle out in the spray booth and would require periodic shutting down of the spray booth for removal thereof.

Various techniques have been employed in an attempt to solve the problem of separating the paint overspray from the water, disposing of the paint overspray and returning the water to the spray booth for further use in conjunction with the waterfall. Various filtration techniques have been attempted to be utilized in conjunction therewith, and various means of attempting to float the paint solids have been utilized. Present techniques of achieving flotation of the paint include the use of chemicals, and even self-floating paint solids. The apparatus of the present invention is designed to function in conjunction with these present techniques which do not form a part thereof.

A major difficulty in the prior art techniques has been a lack of efficiency of separation, which has been aggravated by attempts at one-stage separation. These problems had been further aggravated by various turbulent flows within the treatment tank, including vortex effects, which have materially reduced the efficiency of the take off from the spray booth per se.

Accordingly, in view of the shortcomings of the prior art, it is an object of the concentrating, separating and removing apparatus of the present invention to materially reduce the difficulty associated with the prior art without the necessity of resorting to complicated, expensive or labor intensive equipment.

It is a further object of the apparatus of the present invention to provide an apparatus which is easily retrofittable upon existing systems, or may be easily installed on new systems.

It is a yet further object of the apparatus of the present invention to provide an apparatus which may function on a single spray booth, or alternatively as a part of a centralized system.

It is also an object of the apparatus of the present invention to provide an apparatus which is essentially maintenance-free, and has no element which is in need of replacement or replenishment.

It is an additional object of the apparatus of the present invention to provide means for vastly improving spray booth operation, such as by providing improved circulation of the surface water flow, rapid and continual removal of contaminants from the spray booth, improved performance of flotation chemicals due to circulation increase, and to improve clarification and decontamination of water provided to the spray booth header pumps, thus reducing spray booth nozzle clogging and overspray conditions in the spray booth.

The improved concentrating, separating, and solids removing apparatus of the present invention will better understood by reference to the following drawing, description of the invention, and claims.

SUMMARY OF THE INVENTION

The improved concentrating, separating and solids removing apparatus of the present invention is directed in preferred embodiments to the two stage separation of solids from the associated liquid. In the first stage, the floating solids are removed from the spray booth with only the surface portion of the liquid, thereby to concentrate substantially the floating liquids. In the second stage, floating liquids are further concentrated in the form of a sludge, which is then removed, and the associated liquid is finally returned to the spray booth.

In such first stage of the improved apparatus of the present invention, walls are provided defining a treatment volume. The treatment volume is disposed adjacent to the container for the untreated volume of liquid, which in preferred embodiments is the spray booth. Entry means, preferably in the form of an entry weir, is disposed between the untreated volume of the spray booth and the treatment volume. The floating solids material passes over the top edge of the entry weir into the treatment volume. A baffle is disposed across the surface of the treatment volume and extends downwardly a distance sufficient to prevent flow thereunder of the floating solids material, but will permit flow thereunder of the associated liquid. A take-off chamber is disposed within the treatment volume for receipt of the floating solids material. A take-off weir is disposed in the front portion of the take-off chamber, such that the floating solids and only a portion of the associated liquid will flow over the take-off weir and into the take-off chamber, for channeling to the second, or sludge removal, stage. The liquid flowing from the treatment volume underneath the baffle is returned to the spray booth.

In the second or sludge removal stage, an influent flow from the first stage of the floating solids containing water is received into a sludge treatment volume. The influent flow is then directed across and near the surface of the sludge treatment volume to permit the floating solids to accumulate on the surface thereof as a sludge. The sludge is then removed from the surface of the sludge treatment volume. Substantially clear effluent liquid is withdrawn from the bottom portion of the sludge treatment volume, preferably in an amount equal to the amount of the influent received into the sludge treatment volume. Such effluent is returned to the spray booth for continued use.

BRIEF DESCRIPTION OF THE DRAWING

Exemplary embodiments of the improved concentrating, separating, and solids removing apparatus of the present invention are setforth in the drawing, in which:

FIG. 1 is a fragmented perspective view of the second, or sludge accumulation, stage of the apparatus of the present invention, which shows, inter alia, with arrows indicating the various directions of flow, a fragmented sludge tank for containing a sludge treatment volume, influent means in the form of a bifurcated conduit disposed within the sludge tank, a fragmented sludge box for collecting and receiving sludge, a fragmented surface level control means in the form of a surface level control weir disposed adjacent the tank, effluent conveying means in the form of conduit means for conveying the effluent from a lower portion of the sludge tank to the surface level control means, inflow and outflow chambers of the illustrated fragmented weir, and a sump portion disposed at the bottom of the tank and having a drainage conduit disposed below the level of the effluent conveying means for draining and cleaning the tank;

FIG. 2 is an enlarged side view of the embodiment of FIG. 1 of the sludge accumulation stage of the present invention with a portion of the sludge tank cut away to illustrate the surface level with sludge accumulated thereon, and showing, inter alia, dual effluent conveying means in the form of conduits to convey the effluent from a bottom portion of the tank to the weir flow input chamber, a single weir outflow conduit means connected to the bottom portion of the weir outflow chamber for gravity drainage therefrom, and further showing (in phantom lines) a side view of the bifurcated effluent means behind one of the dual effluent conduits, a scraper disposed atop the sludge tank for scraping sludge from the surface level of the tank up the upwardly sloping portion of the top of the tank wall and into the sludge box for removal of the sludge therefrom;

DETAILED DESCRIPTION OF PREFERRED EMBODIMENTS

The improved apparatus of the present invention for substantially concentrating, selectively separating, and removing floating solids material from the surface of an untreated volume of associated liquid includes two stages. The first stage includes a treatment volume which is disposed adjacent to the container for the untreated volume of liquid. The untreated volume of liquid may in preferred embodiments be a spray booth tank, and the floating solids may be paint over-spray.

Entry means are disposed between the untreated volume and the treated volume. The entry means are preferably a form of an entry weir. The entry weir has a top edge which is disposed at a level just beneath that of the surface of the untreated volume for flow of the floating solids material from the surface of the untreated volume thereover into the treatment volume. A baffle is disposed across the treatment volume and extends above the surface thereof and below the surface thereof to a depth sufficient to prevent the flow thereunder of the floating solids material, but to permit flow thereunder of the associated liquid.

A take-off chamber means for receiving the floating solids material and for channeling the solids material therefrom is provided. The take-off chamber means is disposed adjacent to the treatment volume. A take-off weir is disposed at the front portion of the take-off chamber means and between the treatment volume and the take-off chamber means. A channeling means for directing the flow of the floating solids material from the treatment volume into the take-off chamber is also provided.

The first stage of the apparatus of the present invention thus functions to urge the floating solids material to flow from the untreated volume, past the entry means, into the treatment volume, therefrom to be channeled over the take-off weir, and into the take-off chamber means for discharge.

The entry weir and the take-off weir are preferably adjustable for disposition at selected respective vertical levels to permit adjustment of the volume of flow thereover. The entry weir is also disposed to be substantially longitudinally co-extensive in preferred embodiments with a wall of the container for the untreated volume.

The first stage of the apparatus of the present invention also preferably includes a treated liquid chamber, which is disposed on a side of the baffle opposite the treatment volume. The treated liquid chamber receives liquid which is substantially free of floating solids material from under the baffle. Associated with the treated liquid chamber are treated liquid suction means, which are connected to the treated liquid chamber for removing treated liquid therefrom. In preferred embodiments, these treated liquid suction means feed into the spray booth header system, thereby to return the liquid which is substantially free from any solids material.

The treated liquid means preferably comprise means for removing a substantial volume of treated liquid. When such a substantial volume is removed from the treated liquid chamber, the untreated volume of floating solids and associated liquid are urged to flow into the treatment volume. In turn, liquid from the treatment volume is urged to flow into the treated liquid chamber.

The baffle means of the present invention preferably comprises a pair of walls and the channeling means thereof includes disposition of the baffled walls at an angle of less than 180 degrees to each other.

Also, in such preferred embodiments, a conduit is connected to the take-off chamber at a bottom portion thereof for removal from the take-off chamber of the somewhat concentrated and separated solids material, which is then conducted to the second or sludge accumulation stage, which stage is described in greater detail hereinbelow.

In preferred embodiments, the second sludge or accumulation and removal stage of the present invention comprises a sludge tank having walls for containing a volume of solids containing water from the first stage, described supra, which water contains therein floating solids material to be removed. Such sludge accumulation volume has a surface level zone near the top thereof, and a deep level effluent zone near the bottom of the tank. Influent means for receiving a flow of the solids containing water are provided for directing the influent flow within and horizontally across and near the surface of the surface level zone to permit the solids to float on the surface thereof to accumulate thereby a sludge on the surface of the volume. The sludge is removed by a scraper means for scraping across the surface of the volume and up an upwardly sloping portion of the tank wall to remove the accumulated sludge. A sludge box is preferably disposed adjacent the tank for receiving the scraped sludge.

Surface level control means including at least one surface level control weir are disposed adjacent the sludge tank for receiving effluent therefrom, and effluent conveying means are provided for conveying the effluent from the deep level effluent zone of relative freedom from particulate contamination to the surface level control weir for recycling.

The sludge box is preferably located adjacent the tank and opposite the influent means. The scraper means preferably scrapes across the surface of the volume in the same direction as the flow of floating solids material which is directed within and horizontally across the surface level zone.

The improved apparatus of the present invention also preferably includes on one of the sludge tank walls an upwardly sloping portion disposed at the top thereof which slopes towards the sludge box for cooperative engagement with the scraper means. By means thereof, the sludge may be directed up the upwardly sloping portion by the scraper means and into the sludge box.

The surface level control weirs preferably comprise container means having a weir partition therein to define weir inflow and weir outflow chambers. The weir inflow chamber defines a liquid surface level substantially even with the surface level of the tank volume. This structure results in an equilibration between the level of liquid in the weir inflow chamber and the level of liquid in the tank whenever there is an addition of influent to the tank, with the excess liquid spilling over the weir partition into the weir outflow chamber.

The effluent conveying means preferably comprises conduit means for receiving the effluent from the deep level effluent zone of relative freedom from solids material contamination through an opening in the lower portion of the tank wall and conveying the same to a lower portion of the weir inflow chamber. There are conduit means connected to the weir outflow chamber near the bottom portion thereof for gravity drainage therefrom.

A sump portion is preferably disposed at the bottom of the tank and has a sump drainage conduit disposed below the level of the effluent conveying means for draining and cleaning the tank as becomes necessary.

The influent means of the sludge stage of the present invention may in some embodiments comprise conduit means disposed within the tank for directing the flow of solids material and associated water against an adjacent tank interior surface to be deflected to flow oppositely within and horizontally across the surface level zone. The conduit means provided may be bifurcated or may have multiple openings or single broad opening directed horizontally across the tank. Such conduit means functions to set up a loop-shaped circulating current within the sludge tank wherein solid material which does not immediately float is redirected to the surface until it does in fact float.

Figure 4:
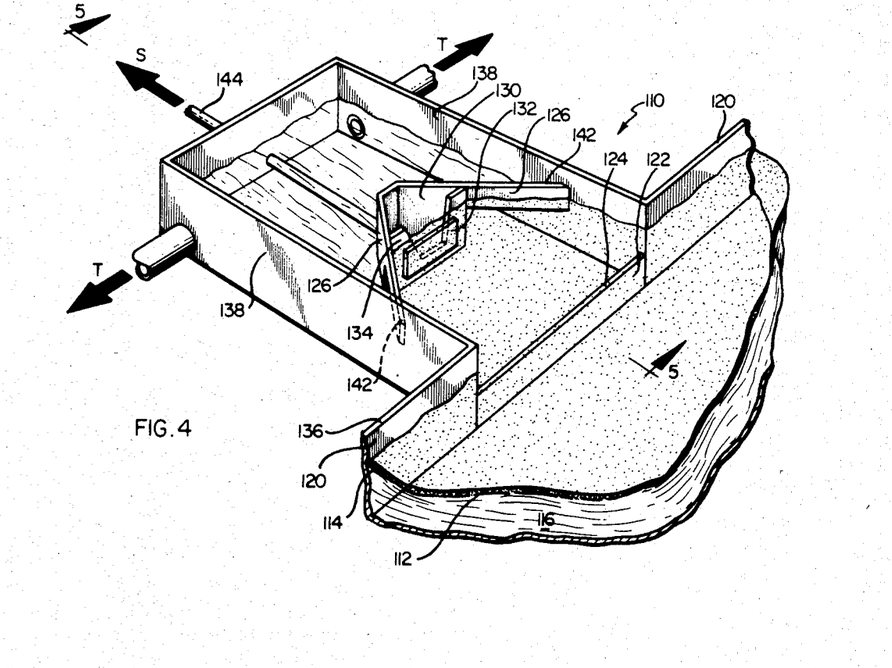
FIG. 4 is a fragmented, perspective view of the first stage of the apparatus of the present invention, which shows, inter alia, the untreated volume, the entry weir separating the untreated volume from the treatment volume, the baffle disposed across the treatment volume for channeling the floating solids into the take-off means over the preferably adjustable take-off weir, with conduit provided for channeling the floating solids to the second, or sludge accumulation stage, as shown in FIGS. 1-3 hereof, and with conduits shown for returning the separated and clear water to the spray booth.
Figure 5:
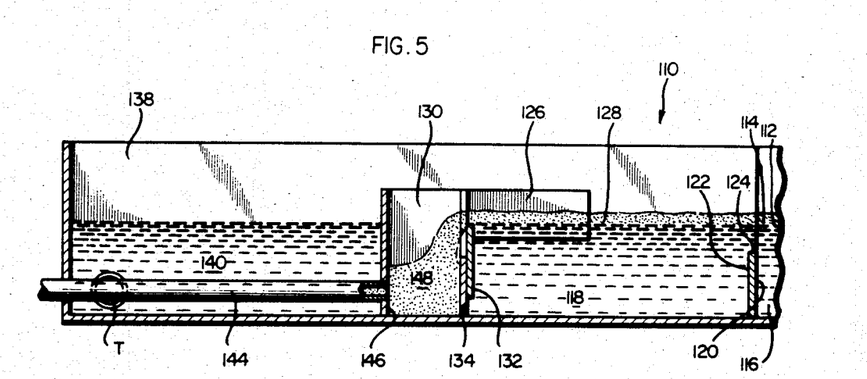
FIG. 5 is an enlarged longitudinal cross-sectional view taken along line 5—5 of FIG. 4 showing the entry of the upper portion only of floating material along with a limited amount of associated liquid from the untreated volume into the treatment volume, and removal of the floating solids from the surface thereof, with only a small amount of associated water, into the take-off chamber for conveying through the take-off conduit to the second, or sludge accumulation, stage of FIGS. 1-3 hereof.

Referring now to the drawing and first to FIGS. 4 and 5 thereof, wherein the first stage of the improved apparatus of the present invention, generally 110, is depicted therein. Such first stage 110 of the improved apparatus of the present invention functions to substantially concentrate, selectively separate and to remove floating solids material 112 from the surface 114 of an untreated volume 116 of associated liquid. First stage 110 includes a treatment volume 118 which is disposed adjacent to the container 120 for untreated volume of liquid 116. Entry means in the form, preferably of an entry weir 122, is disposed between the untreated volume 116 and the treated volume 118. Entry weir 122 has a top edge 124, which is disposed at a level between that of the surface 114 of the untreated volume 116 for flow of the floating solids material 112 from the surface 114 of the untreated volume 116 thereover into the treatment volume 118. A baffle 126 is dispose across the treatment volume 118 and extends above the surface 128 thereof and below the surface 128 thereof to a depth sufficient to prevent the flow thereunder of the floating solids material 112, but to permit flow thereunder of the associated liquid.

A take-off chamber means 130 for receiving the floating solids material 112 and for channeling the solids material 112 therefrom, is provided. The take-off chamber means 130 is disposed adjacent to the treatment volume 118. A take-off weir 132 is disposed at the front portion 134 of take-off chamber means 130, and between the take-off chamber means 130 and the treatment volume 118. Baffle 126 serves as a channeling means for directing the flow of the floating solids material 112 from the treatment volume 118 into the take-off chamber 130.

The first stage 110 of the apparatus of the present invention functions to urge the floating solids material 112 to flow from the untreated volume 116, past the entry weir 122, into the treatment volume 118, therefrom to be channeled over the take-off weir 132, and into the take-off chamber 130 for discharge.

The entry weir 122 and the take-off weir 132 are preferably adjustable for disposition at selected respective vertical levels to permit adjustment of the volume of flow thereover. Entry weir 122 is also disposed to be substantially longitudinally co-extensive in preferred embodiments with a wall 136 of the container 120 for the untreated volume 116.

The first stage 110 of the apparatus of the present invention also preferably includes a treated liquid chamber 138 which is disposed on the side of baffle 126 opposite the treatment volume 118. The treated liquid chamber 138 receives treated liquid 140 which is substantially free of floating solids material 112 from under baffle 126. Treated liquid chamber 138 also preferably includes treated liquid suction means (See Arrows T,T) connected to the treated liquid chamber 138 for removing treated liquid 140 therefrom. These treated liquid suction means T,T in preferred embodiments feed into the spray booth header system, thereby to return the treated liquid 140, which is substantially free from any solids material 112.

The treated liquid suction means T,T preferably comprises means for removing a substantial volume of treated liquid 140. When such substantial volumes are removed from the treated liquid chamber 138, the untreated volume of floating solids 112 and associated liquids 116 is urged to flow into treatment volume 118. In turn, floating solids 112 from treatment volume 118 are urged to flow into the treated liquid chamber 130.

Baffle 126 preferably comprises a pair of walls 142, 142 and the channeling means thereof includes disposition of baffle walls 142, 142 at an angle of less than 180° to each other as shown particularly in FIG. 4.

Figure 1:
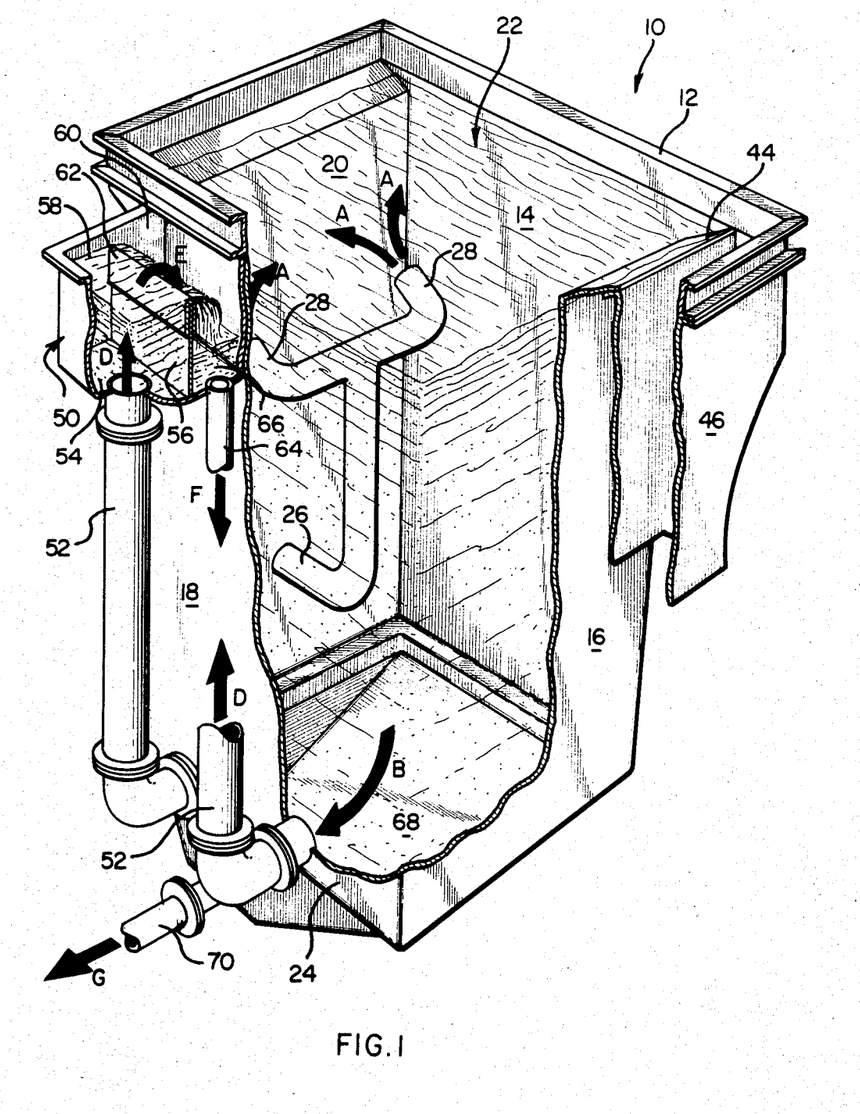
Figure 2:
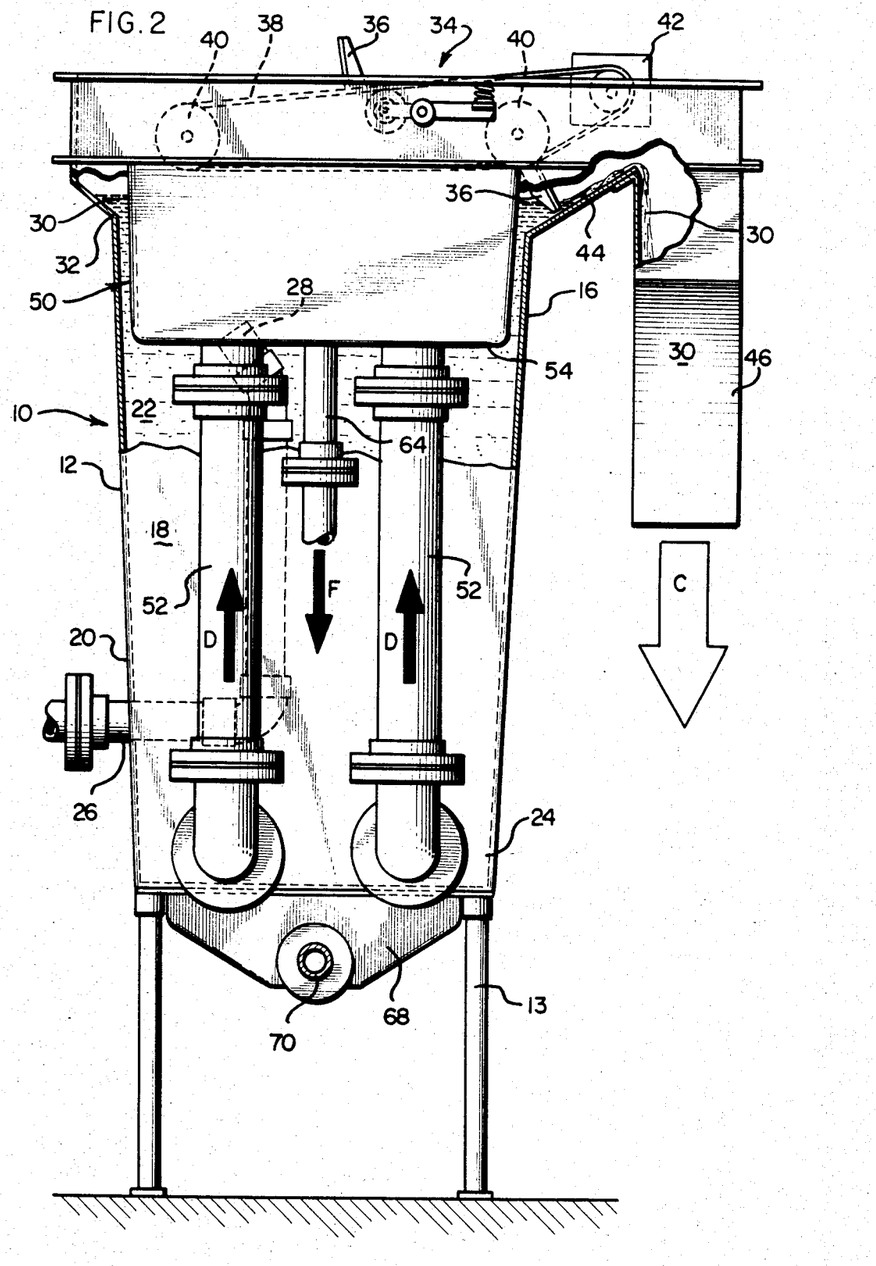
Figure 3:
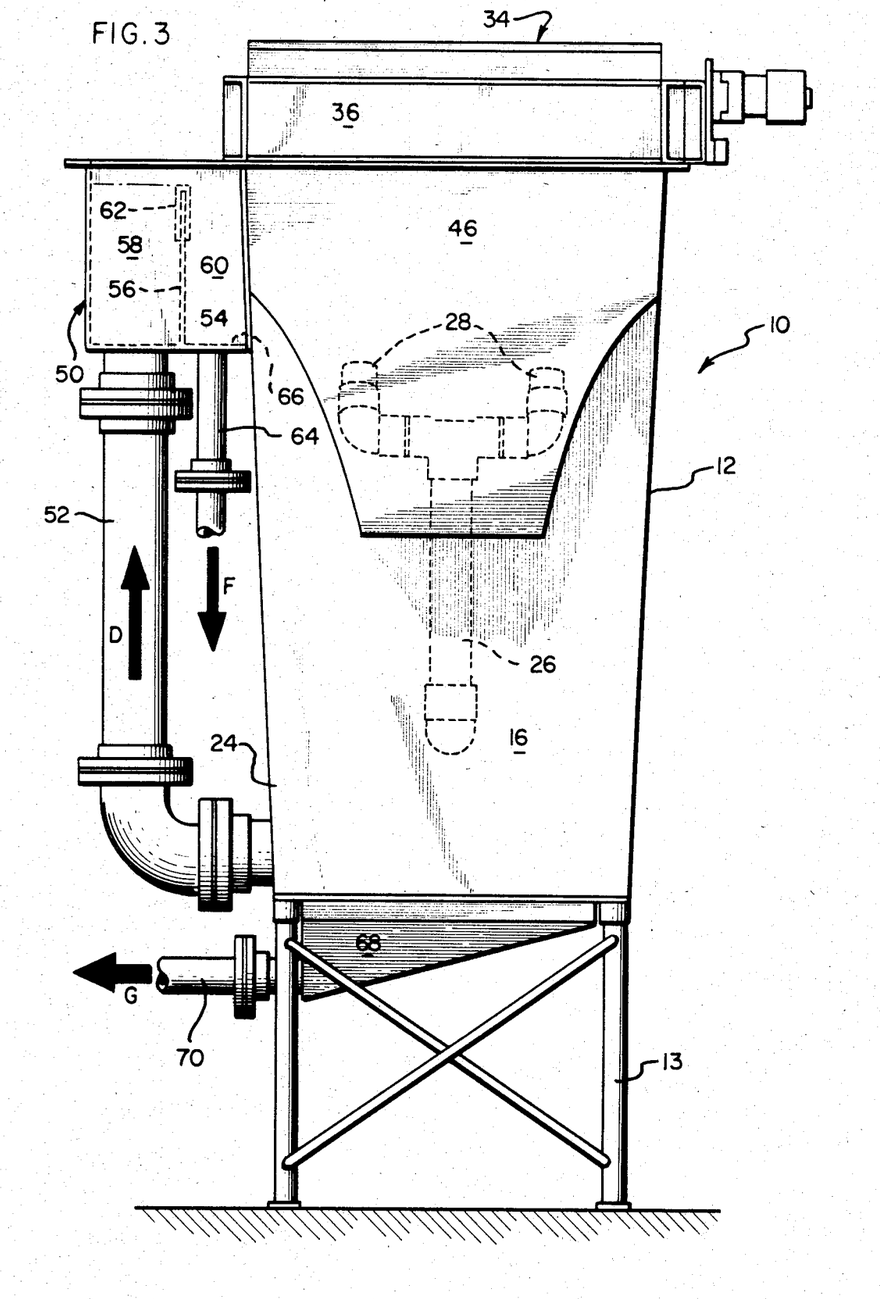
FIG. 3 is an enlarged front view of the embodiment of the sludge accumulation and removal stage as illustrated in FIGS. 1 and 2, as viewed from the sludge box side of the apparatus, and showing, inter alia, the bifurcated effluent conduit means in phantom lines within the sludge tank, also showing the scraper means disposed at the top of the tank for scraping the sludge from the surface level thereof, and further showing the sump portion of the tank and the sump drainage conduit exiting therefrom, with tank support means disposed at the bottom thereof.

Also in such preferred embodiments, a conduit 144 is connected to take-off chamber 130 at a bottom portion 146 thereof for removal from take-off chamber 130 of the concentrated separated solids material 148, as shown in FIG. 5, which material 148 is then conducted to the sludge accumulation and separation stage, as depicted in FIGS. 1, 2 and 3 hereof.

Referring to the second or sludge accumulation and disposal stage as exemplified in FIGS. 1, 2 and 3 in particular, such sludge stage of the present invention generally 10 comprises a sludge tank 12 supported on a sludge tank support frame 13 and having walls 14, 16, 18, and 20 for containing a volume generally 22 of influent water containing floating solids material to be removed therefrom, such volume 22 being received from the first stage generally 110, as set forth in FIGS. 4 and 5, supra. A surface level zone near the top of the volume 22 is formed in the vicinity of Arrows A of FIG. 1. The volume 22 also has a deep level effluent zone. See Arrow B of FIG. 1 near the bottom portion 24 of sludge tank 12.

Influent means in the form of a conduit 26 which may have bifurcated portions 28, 28 enters tank 12 through the wall 20. Influent conduit means 26 is provided for directing the flow within and horizontally across the surface level zone, and in a direction opposite to that of Arrows A in FIG. 1. As described, supra, solids which do not immediately float are recirculated in a loop-shaped current, by means of such bifurcated pportions 28, 28. The result is to accumulate a sludge 30 on the surface 32 of the volume, as shown in FIG. 2.

As shown in FIGS. 2 and 3, a scraper means generally 34 is provided for scraping across the surface 32 of the volume 22 to remove the accumulated sludge 30. Scraper means 34 preferably comprises a plurality of blades 36 extending across the surface 32 of the volume which are connected at either end to chain drives 38. In some embodiments, chain drives 38 are driven across pulleys 40 by motor 42 to cause the horizontally extending scraper blades 36 to scrape across surface 32 of volume 22 to scrape the sludge 30 up an upwardly angling portion 44 of tank wall 16 and to sludge box 46. In alternative preferred embodiments, pneumatic driven scraper means, and with self-reversing carriage, may be utilized. Sludge box 46 is disposed adjacent the front tank wall 16 for ease of removing sludge 30 from sludge box 46. See Arrow C.

A surface level control means in the form of at least one surface level control weir generally 50 is disposed adjacent one of the side tank walls 18 and is supplied with effluent through preferably dual upwardly extending effluent conduits 52, 52, which open into the bottom portion 54 of weir 50. See Arrows D, D. Weir 50 contains a weir partition 56 to define a weir inflow chamber 58 and a weir outflow chamber 60 equilibrate the level of the liquid in weir inflow chamber 58 with that of tank 12. The effluent liquid in weir inflow chamber 58, when additional influent liquid (Arrows A) is added to the tank, spills over the top 62 of weir partition 56 into weir outflow chamber 60 to be drained. See Arrow E. Weir outflow chamber 60 is drained by means of a weir outflow conduit 64 disposed at the bottom portion 66 of weir outflow chamber 60. See Arrow F.

A sump portion 68 is provided at the bottom of tank 12 for draining and cleaning the tank through an opening in the lower portion of the tank wall by means of a sump drainage conduit 70. See Arrow G.

Preferred embodiments of the apparatus of the present invention are designed specifically to process floatable paint sludge generated from large industrial spray booths. However, other applications are contemplated as being within the scope thereof.

In such preferred applications, the apparatus of the present invention replaces conventional filters. The apparatus of the present invention functions without filter media, and instead transfers floating paint sludge from the spray booth reservoir to the first stage of the unit for initial consolidation and concentration, and from there to the second stage of the apparatus, where it is further accumulated and substantialy concentrated in the form of a sludge on the surface. In applications where the spray booth is more than 30 to 40 feet in length, more than one first stage unit may be necessary.

In some applications, supplementary surface circulation nozzles may be used in the spray booth to direct floating paint sludge to the entry weir, although in many such applications, no such supplemental nozzles would be necessary.

The capacity of the sludge tank is approximately 150 gallons, with a flow rate of capacity approximately 100 gallons per minute. This high flow-to-capacity ratio enables the apparatus to maximize its paint sludge handling capabilities.

A non-clogging recessed impeller vortex pump is preferably utilized for operating the second stage of the present invention. Such pump allows passage of large particles without direct impellar contact, which has proved necessary when paint conditions periodically result in "live" sludge paint. Double mechanical seals within the pump/motor combination are continuously flushed with fresh water to prevent pump failure from possible introduction of "live" paint.

While preferred embodiments of the apparatus of the present invention function to service floating detactified paint sludge, the present apparatus will also function under less than ideal conditions. One such reason for this versatility of functioning is the continuous flow rate of 80-100 gallons per minute. Since no actual filter medium is used, "live" paint is minimized, and damage from "live" paint is also minimized. Also, paint material that does in fact sink is automatically returned to the spray booth reservoir for recycling from the bottom of the second stage sludge tank. Accordingly, the sludge tank of the second stage is thus self-flushing.

The sludge tank of the second stage, and the sheet compenents of the first stage, one preferably constructed from 3/16" steel sheet. All flanges, tank supports, weir boxes and sludge discharge areas are preferably integral with the tank body. Interior surfaces and all welded surfaces are preferably treated with shop-applied rust proofing. The outside surfaces are shop-primed and preferably finished in a heavy duty grade of rust-proofing paint.

The tank support structure is fabricated preferably from square or rectangular structural steel tubing ASTM A-36 and is braced as required with 3"×3"×¼" HRS angles. Connections therebetween are shop-welded whenever possible, and all other connections utilize angle braces or gusset plates not less than ¼" in thickness and bolted with hexagonal machine bolts not less than ⅜" in diameter.

The scraper support frame is preferably fabricated from 2"×2"×¼" HR angle iron with welded corners and is carried on semi-steel groove roolers supported by grease-lubricated roller barrings. The actuator screw for the sludge scraper assembly is made from ⅞" stock with a length of 38". The actuator screw is driven by means of a rotary vane air motor, such as that available from the Gast Manufacturing Corporation, together with a suitable air control lubrication apparatus, speed reducer, and coupling. The scraper blade and sludge dispository area are fabricated from stainless steel to obtain necessary flexibility and to inhibit any sludge adhesion.

The pump which is preferably utilized as the influent pump on the sludge stage apparatus is a standard all-iron, recessed impellar, end suction centrifugal pump with 4" flange suction and discharge connections and is equipped with a double mechanical seal, including pressure regulators for seal flush. Such a pump is available from the Midland Corporation. Such pumps are capable of passing solids up to 3 ⅞" in diameter. The pumps in preferred embodiments are mounted on channel steel bases and include flexible coupling and coupling guards. Power for the pumps should be provided by 5 HP, 1150 RPM, 30/60 hz/460 volt, 254 U frame, 7 EH spec. Delco Motors. Rated: 100 GPM at 27′ TDH at 1150 RPM.

The control panel in preferred embodiments includes a Square D model, SCA-21 combination starter, NO/NC contacts, oil tight start stop station in covers, pilot light-115 volt, 35 VA central transformers, 3′B′ heater elements, and 2 Asco model 8210 D2 solenoid valves-115 volts.

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An improved apparatus for substantially concentrating, selectively separating, and removing floating solids material from the surface of an untreated volume of associated liquid, said apparatus comprising:
   walls defining a treatment volume, said treatment volume disposed adjacent the untreated volume of liquid;
   entry means disposed between the untreated volume and said treatment volume;
   combined baffle and channeling means disposed across said treatment volume, and extending above the surface thereof and below the surface thereof to a depth sufficient to prevent flow thereunder of the floating solids material, but to permit flow thereunder of the associated liquid; said combined baffle and channeling means further for directing the flow of the floating solids material from said treatment volume directly into a take-off chamber means;
   said take-off chamber means receiving the floating solids material and for channeling the solids material therefrom, said take-off chamber means disposed adjacent said treatment volume; and
   a take-off weir disposed at the front portion of said take-off chamber means and between said take-off chamber means and said treatment volume;
   whereby the floating solids material flows from the untreated volume, past the entry means, into the treatment volume, and is channeled therefrom over the take-off weir into the take-off chamber means for discharge.

2. The improved floating solids concentration, separation and removal apparatus of claim 1 wherein said entry means comprises an entry weir having a top edge disposed at a level between that of the surface of the untreated volume for flow of the floating solids material from the surface of the untreated volume thereover into the treatment volume.

3. The improved floating solids concentration, separation and removal apparatus of claim 2 wherein said entry weir is adjustable for dispostion at a selected vertical level.

4. The improved floating solids concentration, separation and removal apparatus of claim 1 wherein said entry means comprises means for substantially preventing settled solids materials from flowing from the lower portion of the untreated volume into the treatment volume.

5. The improved floating solids concentration, separation and removal apparatus of claim 1 wherein said take-off weir is adjustable for disposition at a selected vertical level.

6. The improved floating solids concentration, separation and removal apparatus of claim 2 wherein the untreated volume is disposed within a container having walls, and the entry weir is disposed to be substantially longitudinally co-extensive with a wall of the container for the untreated volume.

7. The improved floating solids concentration, separation and removal apparatus of claim 1 further comprising a treated liquid chamber disposed on the side of said combined baffle and channeling mean located opposite said treatment volume, said treated liquid chamber receiving liquid which is substantially free of floating solids material from under said baffle.

8. The improved floating solids concentration, separation and removal apparatus of claim 7 further comprising treated liquid suction means connected to said treated liquid chamber for removing treated liquid therefrom.

9. The improved floating solids concentration, separation and removal apparatus of claim 8 wherein said treated liquid suction means feeds into a spray booth header system.

10. The improved floating solids concentration, separation and removal apparatus of claim 8 wherein said treated liquid means comprises means for removing a substantial volume of treated liquid, whereby the untreated volume of floating solids and associated liquid is urged to flow into said treatment volume, and treated liquid in turn is urged to flow from said treatment volume into said treated liquid chamber.

11. The improved floating solids concentration, separation and removal apparatus of claim 1 wherein said combined baffle and channeling means comprises a pair of walls and said channeling means includes disposition of said baffle walls at an angle of less than 180° to each other.

12. The improved floating solids concentration, separation and removal apparatus of claim 1 wherein a conduit is connected to said take-off chamber at a bottom portion thereof for removal therefrom of the concentrated and separated solids material, and to conduct such separated solids material to a sludge accumulation and separation stage.

13. An improved floating solids concentration, separation and removal apparatus comprising means for initially at least partially concentrating, separating and removing a solids material from a liquid material, and further comprising means for further concentration of the solids material in the form of a sludge accumulation and disposal stage, said further concentration means comprising:

a sludge tank having walls for containing a volume of substantial depth of influent water containing solids material to be separated therefrom, said volume having therein a surface level zone near the top of said volume and having a deep level effluent zone near the bottom of said sludge tank of substantial depth;

influent means for receiving a flow of the solids containing water and directing the flow within and horizontally across the surface level zone to distribute the floating solids material to accumulate a concentrated solids sludge on the surface of the volume for removal and to render the deep level effluent zone relatively free of the solids contamination, and to recirculate solids which do not immediately float in a loop-shaped current for continuous return to the surface until said solids float;

means for removing the accumulated sludge from the surface of the volume;

surface level control means including at least one surface level control weir disposed adjacent said tank for receiving effluent therefrom; and effluent conveying means for conveying the effluent from the deep level effluent zone of relative freedom from solids material;

whereby floating solids material and associated liquid is received in substantially concentrated form, further concentrated in the form of a sludge on the surface of the volume of water, and removed from the sludge tank for disposal.

14. The improved floating solids concentration, separation and removal apparatus of claim 13 wherein said means for removing the accumulated sludge comprises scraper means.

15. The improved floating solids concentration, separation and removal apparatus of claim 13 wherein said effluent conveying means conveys at least a portion of the deep level effluent to said surface control level weir for recycling.

16. The improved floating solids concentration, separation and removal apparatus of claim 13 includes a means for discharging a further portion of the effluent from the tank.

17. The improved floating solids concentration, separation and removal apparatus of claim 13 further comprising a sludge box located adjacent said tank and opposite said influent means.

18. The improved floating solids concentration, separation and removal apparatus of claim 13 wherein said means for removing accumulated sludge from the surface of the volume comprises a scraper means which scrapes acroos the surface of the volume in the same direction as the flow of solids containing water and is directed within and horizontally across the surface level zone.

19. The improved floating solids concentration, separation and removal apparatus of claim 13 wherein said surface level control weirs comprise container means having a weir partition therein to define a weir inflow chamber and a weir outflow chamber, said weir inflow chamber defining a liquid surface level substantially even with the surface level of the sludge tank volume, whereby the addition of influent to the sludge tank causes the level of liquid in the sludge tank to equilibrate with the level of liquid in said weir inflow chamber, with an excess spilling over said weir partition into said weir outflow chamber.

20. The improved floating solids concentration, separation and removal apparatus of claim 13 wherein said effluent conveying means comprises effluent conduit means for receiving the effluent from the deep level effluent zone of relative freedom from solids material through an opening in a lower portion of said sludge tank walls and conveying the same to a lower portion of said surface level control weir inflow chamber.

21. The improved floating solids concentration, separation and remoyal apparatus of claim 13 further including disposal conduit means connected to said surface level control weir outflow chamber near a bottom portion thereof for gravity drainage therefrom to remove any settled out solids materials.

22. The improved floating solids concentration, separation and removal apparatus of claim 13 further including a sump portion disposed at the bottom of said sludge tank and having a sump drainage conduit disposed below the level of said effluent conveying means for draining and cleaning said sludge tank to remove any settled out solids materials.

23. The improved floating solids concentration, separation and removal apparatus of claim 13 wherein said influent means comprises conduit means disposed within said tank for directing the flow of solids containing water against an adjacent tank interior wall surface to be deflected to flow oppositely within and horizontally across the surface level zone.

24. The improved floating solids concentration, separation and removal apparatus of claim 13 wherein one of said sludge tank walls includes an upwardly sloping portion disposed at the top thereof for cooperative engagement with said sludge removal means, whereby the sludge may be directed up said upwardly sloping portion by said sludge removal means for removal therefrom and for disposal.

25. The improved floating solids concentration, separation and removal apparatus of claim 1 further comprising means for further concentrating the solids material, said further concentration means comprising:
a sludge tank having walls for containing a volume of substantial depth of influent water containing solids material to be separated therefrom, said volume having therein a surface level zone near the top of said volume and having a deep level effluent zone near the bottom of said sludge tank;
deflection means disposed within and substantially near the surface level zone of said sludge tank;
influent conduit means disposed at an acute angle with respect to said deflection means and in spaced relationship therefrom for receiving a flow of the water containing the solids material and for directing substantially the entirety of the flow against said deflection means at an acute angle of incidence to be deflected at an acute angle of reflection and substantially the entirety of the deflected flow to traverse horizontally across the surface level zone, thereby to concentrate and to accumulate the solids material in the form of sludge on the surface of the volume for removal;
means for removing the accumulated sludge;
surface level control means including at least one surface level control weir disposed adjacent said tank for receiving effluent therefrom; and
effluent conveying means for conveying the effluent from the deep level effluent zone of relative freedom from solids material.

26. The improved floating solids concentration, separation and removal apparatus of claim 25 wherein said deflection means comprises an interior surface of said sludge tank wall and said influent conduit means is disposed to direct the flow of water containing the solids material against an adjacent tank interior wall surface to be deflected to flow oppositely within and horizontally across the surface level zone.

* * * * *